No. 643,152. Patented Feb. 13, 1900.
H. M. PARKER.
COTTON PRESS.
(Application filed Aug. 30, 1899.)
(No Model.) 2 Sheets—Sheet 1.
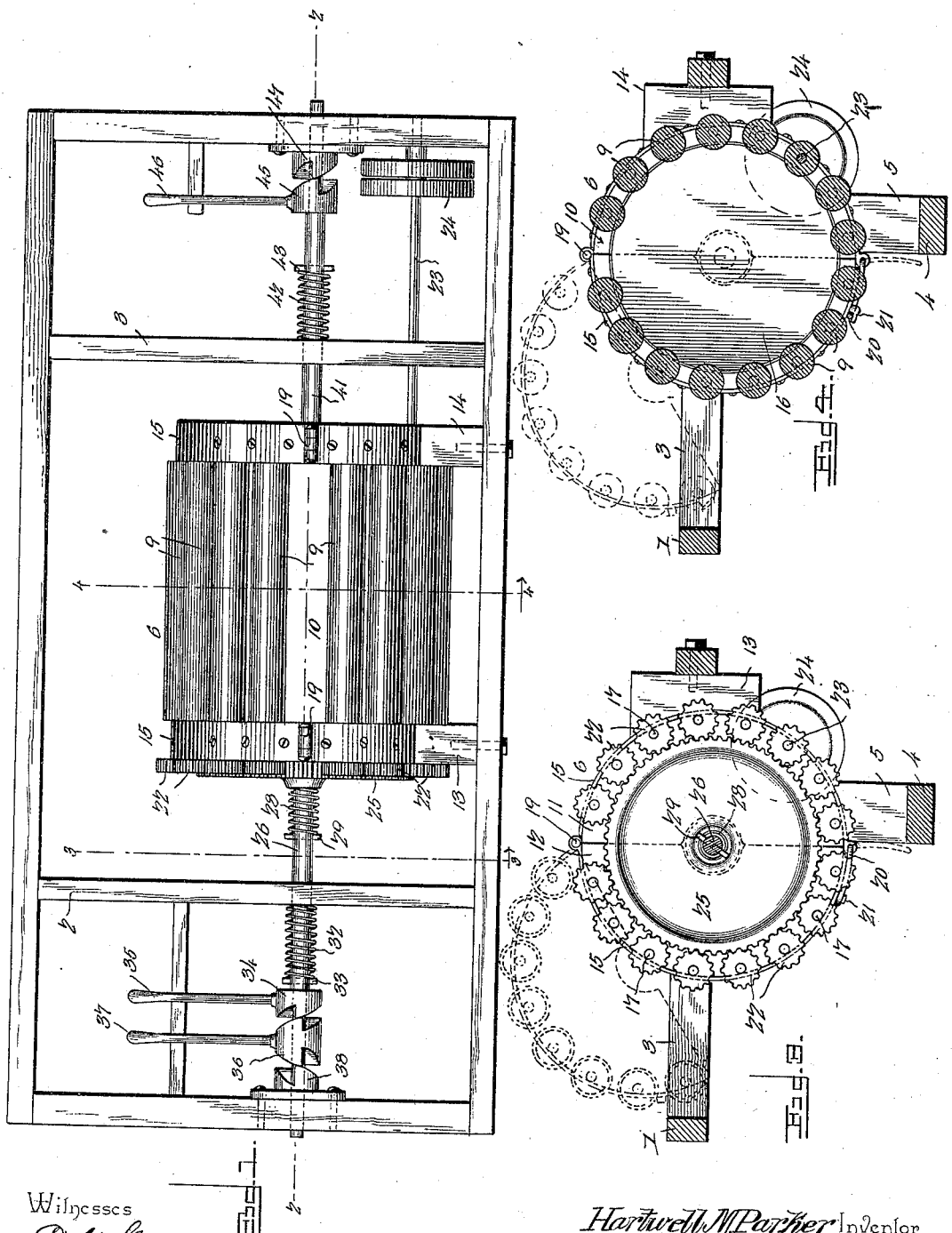
Witnesses Hartwell M. Parker, Inventor
By his Attorneys,
C. A. Snow & Co.

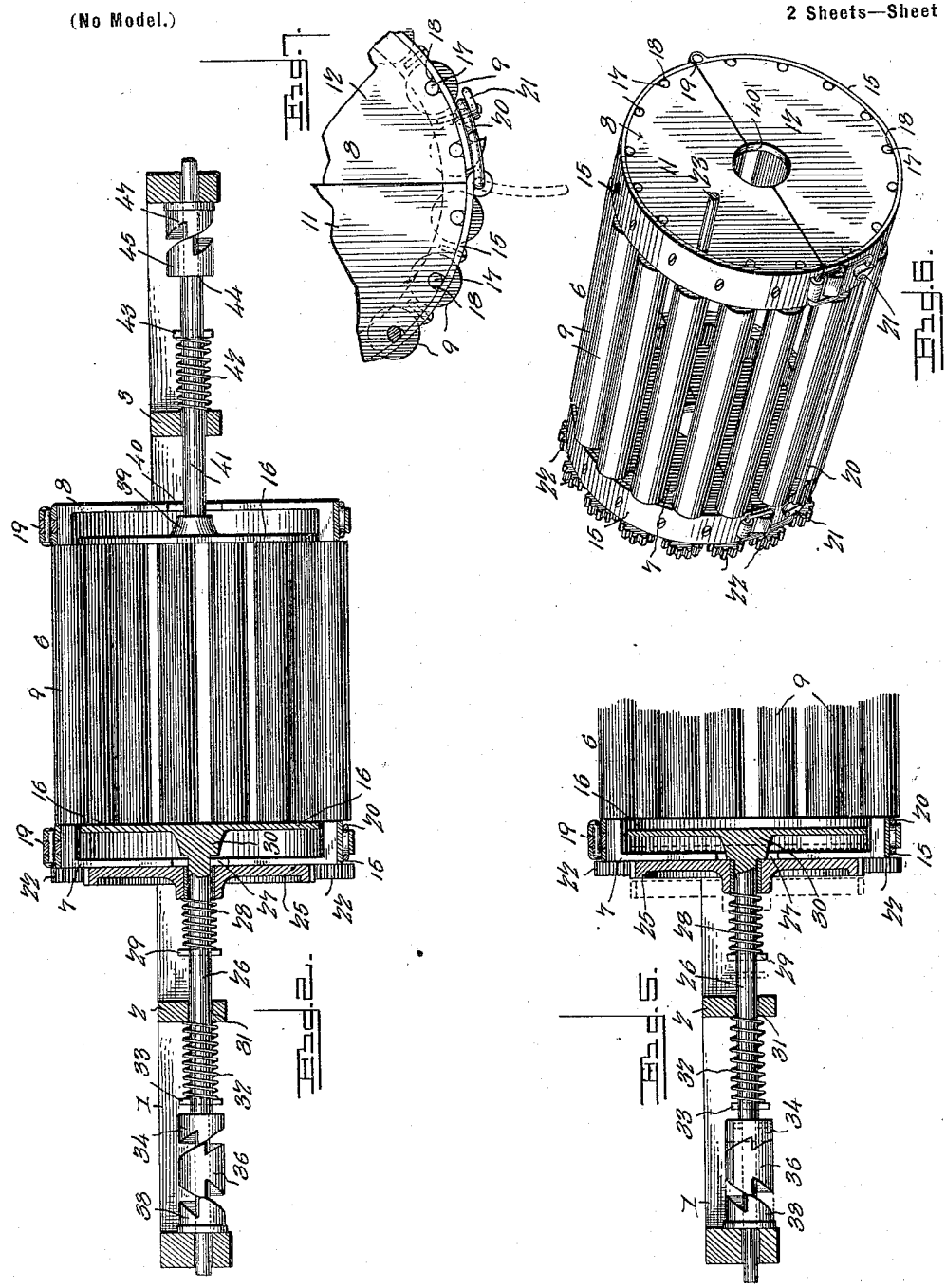

UNITED STATES PATENT OFFICE.

HARTWELL M. PARKER, OF FRY, NORTH CAROLINA.

COTTON-PRESS.

SPECIFICATION forming part of Letters Patent No. 643,152, dated February 13, 1900.

Application filed August 30, 1899. Serial No. 728,993. (No model.)

*To all whom it may concern:*

Be it known that I, HARTWELL M. PARKER, a citizen of the United States, residing at Fry, in the county of Anson and State of North Carolina, have invented a new and useful Cotton-Press, of which the following is a specification.

My invention relates to cotton-presses of the roller-type, which are designed to compress gin-cotton into cylindrical bales; and the object of my invention is to provide a simple, durable, and efficient machine which shall take the cotton direct from the gin and compress it into a cylindrical bale, provision being made for the endwise as well as the peripheral compression of the bale to insure its uniform density and regularity of form.

Another object of the invention is to provide simple means for effecting the discharge of the bale and for preventing the possible derangement of the several gears employed as part of the actuating mechanism of the apparatus.

Still further and subordinate objects will hereinafter more fully appear as the necessity for their accomplishment is developed in the succeeding description.

Referring to the drawings, Figure 1 is a top plan view of my press and its supporting and actuating mechanism complete. Fig. 2 is a central longitudinal section on the line 2 2 of Fig. 1, certain of the parts being shown in elevation. Fig. 3 is a sectional view on the line 3 3 of Fig. 1, looking in the direction indicated by the arrow. Fig. 4 is a similar view on the line 4 4 of Fig. 1, viewed in the direction of the arrow. Fig. 5 is a fragmentary sectional view, partly in elevation, showing one of the building-up heads retracted and showing in dotted lines the positions assumed by the parts when the master-gear is drawn back. Fig. 6 is a detail perspective view of the compression-cylinder removed from the machine and shown in a position which more clearly illustrates its construction. Fig. 7 is a fragmentary detail view of one end of the compression-cylinder, showing the means for locking the sections thereof.

Referring to the drawings, in which like numerals designate corresponding parts in the several views, 1 indicates the supporting-frame of my press, which is preferably rectangular in form and is provided with transverse bearing-beams 2 3 and with a longitudinal depending frame 4, carried below the supporting-frame by end bars 5, bolted or otherwise secured at their upper ends to the inner sides of the ends of the frame 1.

6 indicates what I may term the "compression-cylinder," within which the bale is formed and compressed simultaneously. This cylinder is cylindrical in general contour and comprises, substantially, disk-shaped metal heads 7 and 8, intermediate of which and adjacent to their peripheries is mounted a substantially circular series of longitudinally-disposed compression-rollers 9, arranged at equidistant intervals, except at the top of the cylinder, where a feed-opening 10 is left for the admission of the cotton. In its general aspect the press is substantially identical with presses of this type, and before proceeding to a detailed description of the construction of this cylinder it may be premised that these several compression-rollers constituting the compression-cylinder are designed to rotate in the same direction in order to draw in the cotton and to cause it to be revolved and wound within the cylinder and thus gradually compressed to form a cylindrical bale.

The general utility of the device being understood, I will now consider its peculiarities, the utilization of which makes possible the accomplishment of the several objects of the invention. The cylinder-heads 7 and 8, which, as has been stated, are circular, are composed, respectively, of two semicircular sections 11 and 12, the former of which is rigidly supported within the frame 1 by brackets 13 and 14, secured, respectively, to one of the side bars of the frame 1 and to the depending frame 4. Each of the four head-sections is composed of a semicircular plate, around the edge of which and extending inwardly is a semicylindrical or circular band 15, serving when the head-sections are in juxtaposition as sockets for heads 16 to be described and as journals retaining bands and spacers for the journals 17 of the several compression-rolls 9, which journals project, as illustrated, through peripheral bearing-recesses 18, formed at the peripheries of the cylinder-heads. The sections 11 and 12 are hinged, as indicated at 19, at their upper connecting edges, it being noted that the sections are divided on a vertical line and that the hinge and the feed-opening are located at the upper end of the vertical axis of the compression-cylinder. Any suitable means for locking the two compression-cylinder sections, formed, respectively, by the fixed head-sections and their connected rolls and the hinged head-sections and their connected rolls, may be provided; but I prefer to employ the swinging bail 20, carried by the fixed section and designed to be retained by turn-buttons or equivalent devices 21 on the fixed section.

22 and 22, &c., indicate small pinions terminally keyed to the compression-roll journals 17 beyond one of the compression-cylinder heads, the journal of one of the compression-rolls being extended beyond the end of the cylinder opposite the pinions to form a power-shaft 23, upon which are mounted pulleys 24, designed for the transmission of rotary motion to the connected compression-roll and its pinion. This shaft 23 is geared with one of the pinions on a compression-roll supported by the fixed section of the compression baling-cylinder in order that the shaft may be journaled in bearings, which are in fixed relation to the source of power, thus providing means for properly driving the entire chain of compression-rolls.

25 indicates a master-gear loosely journaled upon the shaft 26, extending coaxially from the head 16 through an axial opening 27 in the compression-cylinder head 7. The master-gear is retained against the outer face of the cylinder-head 7 and in mesh with the several pinions 22 by a spiral or other suitable spring 28 wound upon the shaft 26 and bearing against the hub of the master-gear and against a pin or other fixed projection 29 upon the shaft. The shaft 26, extending from the hub 30 of one of the heads 16, passes through a bearing 31 in the beam 2 and carries immediately therebeyond a spiral spring 32, which I will term the "head-retracting" spring, bearing at its opposite ends against the beam 2 and against the pin or projection 33, similar to the pins 29. Slightly beyond the end of the spring 32 the shaft is reduced and is provided with a head cam-collar 34, fitted with an upwardly-extending handle 35, and with a master-gear cam 36, fitted with a handle 37, a fixed cam-collar 38, arranged coaxially with the shaft and with the collars 34 and 36, being secured to the inner face of one of the end beams of the frame 1. It will be noted that the contiguous faces of these several collars are correspondingly formed with inclined faces in order that they may be held apart, as illustrated in Fig. 1, or turned into engagement, as shown in Fig. 5. Before proceeding to the description of the operation of this mechanism just described I prefer to call attention to mechanism in some respects its duplicate and located at the opposite end of the cylinder. Thus a second head 16, located at the opposite end of the cylinder, is likewise provided with a hub 39, from which extends through an opening 40 in the head 8 a second head-shaft 41, having a bearing in the beam 3 and supporting a spiral spring 42, seated against the beam 3, and a pin 43 upon the shaft, the spring-pressure being exerted to move the shaft 41 longitudinally in a direction to cause the retraction of the connected head 16, the springs 32 and 42 thereof serving the purpose of retracting mechanism, tending at all times to retract the heads 16 into their sockets and from their nominal positions, which, as illustrated in Fig. 2 of the drawings, is flush with the opposite ends of the compression-rolls. The shaft 41, like the shaft 26, is reduced, as indicated at 44, and upon the reduced end is mounted a second head cam-collar 45, provided with a lever 36 and designed to be turned to cause its engagement with or disengagement from a second fixed cam-collar 47, similar to the collar 38 and secured to the opposite ends of the frame 11.

The shafts 26 41 of my improved press are not rotated on their axes; but these shafts are slidable longitudinally in their bearings on the press-frame under the influence of the retracting-springs and the independent sets of cam-collars. The building-up heads 16 are preferably mounted on the inner ends of the shafts 26 41, so as to occupy a fixed relation to said shafts, and these heads 16 are supported by the shafts in a non-revoluble condition within the baling-chamber afforded by the compression-cylinder.

Inasmuch as the description of the operation of the entire press will most accurately define the functions of the several elements described and their interrelation I shall now proceed to an exposition of the manipulation of my press when in practical operation.

The parts being in the positions illustrated in all of the figures with the exception of Fig. 5, the cotton is fed direct from the gin through the feed-opening 10 to the compression-cylinder. The power is applied by the application of a belt or other transmitter to the power-pulley 24, rotating the power-shaft 23 and its connected compression-roll and pinion. The loosely-mounted master-gear 25, being in mesh with all of the pinions 22, will thus be rotated by the pinion mounted at the extremity of the power-shaft and will in turn impart like rotary movement to the several end-meshed pinions in the same direction. The cotton is fed to the compression-cylinder through the feed-opening, so as to pass into the cylindrical chamber or space formed by the annular series of compression-rolls, the cotton first forming an outer layer; but this layer and the succeeding layers as the material continues to be fed are forced or crushed to the center from the circumference until a cylindrical bale of the proper dimensions has been formed, at which time the movable or hinged section 12 of the compression-cylinder is released by turning the turn-buttons 21, and it is elevated, as shown in dotted lines in Figs. 3 and 4, to effect the removal of the bale. Heretofore a great disadvantage arising from the use of this class of presses has been the difficulty encountered in releasing the bale and in restoring the compression-cylinder to its normal position for a continuation of the baling operation. This difficulty of removal is entirely obviated in my press by a provision of the heads 16, which during the formation of the bale are located flush with the ends of the compression-rollers and present smooth unbroken surfaces, against which the ends of the bale rotate and by which the bale ends are made smooth and uniform. As soon, however, as it is desired to release the bale the movable cylinder-section is thrown up, as stated, and the levers 35 and 46 are thrown back sufficiently to permit the engagement of the cam-faces of the head cam-collars 34 and 45 with the opposed cam-faces of the collars 36 and 47, respectively, at which time the springs 32 and 42 will become effective and the ends 16 will be retracted into their sockets, whereby the end pressure upon the bale will be relieved and the release of the latter will be effected.

By reference to Fig. 5 of the drawings, in which is illustrated the position of one of the heads 16 after retracting, it will be noted that its hub is by this movement brought into contact with the inner face of the master-gear 25 and that the cam-collars 36 and 38 are still out of engagement. It now appears proper to state that the reason for the contemplated withdrawal or disengagement of the master-gear from the several pinions is in order that the engaging teeth or spurs on the master-gear 25 and pinions may not be deranged when the elevated section of the cylinder is thrown down. Therefore when the bale has been discharged from the compression-cylinder, the parts being in the position indicated in Fig. 5, the lever 37 is actuated to permit the engagement of the cam-collars 36 and 38, at which time the spring 32 will again become active and will urge the shaft 26 longitudinally to bring the head 16 and the master-gear 25 into the position indicated in dotted lines in said figure, at which time the master-gear will be sufficiently removed from the contiguous head of the cylinder to permit the removable cylinder-section to be dropped back and secured in place without bringing the teeth of the pinions into violent contact with the teeth of the master-gear 17. The compression-cylinder having been made ready for the reception of the cotton, the levers 37, 35, and 46 are again operated to restore the several collars to the positions indicated in Fig. 2 of the drawings, thereby restoring the heads to their normal positions and causing the spring 28 to urge the master-gear into meshing position with the pinions, the teeth of which as they are slightly moved will be presented to the spaces between the teeth of the master-gear, at which time the spring 28 will throw said master-gear into mesh with the pinions and the press will be in condition for the repetition of the baling operation.

From the foregoing it will be noted that I have devised a simple, durable, and efficient cotton-press which economizes space and is easily operated; but I do not desire to limit myself to the construction of all details illustrated and described, but reserve the right to change, modify, or vary said details within the scope of the protection prayed.

What I claim is—

1. A cotton-press comprising a compression-cylinder having peripheral compression-rolls and divided on a vertical line into complemental sections, one of which cylinder-sections occupies a fixed relation to the other, and said sections being hinged together at their upper ends and confined normally in closed relation by a locking device on the under side of the cylinder, building-up heads supported in laterally-movable relation to each other within the compression-cylinder, retracting-springs tending to move the heads normally in opposite outward directions, and cam-formed pressure devices to move the heads independently of each other and inwardly against the tension of their retracting-springs, substantially as described.

2. A cotton-press comprising a divided compression-cylinder provided with peripheral rolls, internal building-up heads, means for normally moving the said heads in outward directions, and a master-gear for actuating said compression-rolls and movable in a direction away from the roll-gears simultaneously with the outward movement of one of said heads, for the purpose described, substantially as set forth.

3. A cotton-press comprising a compression-cylinder having peripheral compression-rolls provided with gears, movable building-up heads having means for normally moving the same in opposite directions, a master-gear in operative relation to the several pinions, and means for throwing said gear out of mesh with said pinions, said master-gear being movable into gear with the pinions at the period of inward movement of one of said heads, substantially as described.

4. In a cotton-press, the combination with a compression-cylinder provided with peripheral compression-rolls and actuating-pinions, of reciprocatory building-up heads, within the cylinder, a shaft connected with one of said heads and capable of moving in a direction to retract the head, a master-gear loosely mounted upon said shaft and means for actuating the said shaft to retract said connected compression-head and to thereby throw the master-gear out of mesh with the pinions, substantially as specified.

5. In a cotton-press, the combination of a compression-cylinder having the socketed divided heads hinged one to the other and a series of peripheral compression-rolls, the movable building-up heads within the socketed cylinder-heads, means for retracting the compression-heads normally in outward directions, and independent sets of operating-cams for positively moving said heads against the action of their retracting devices, substantially as described.

6. In a cotton-press, the combination of a compression-cylinder having a series of compression-rolls each provided with an actuating-pinion, the oppositely-movable heads, spring-actuated slidable shafts connected fast with said heads and tending to normally retract the latter in opposite outward directions, a master-gear mounted on one of said shafts and movable in an outward direction with the head thereon, and independent sets of cam-collars for individually controlling the movements of said shafts against the action of the retracting-springs, substantially as described.

7. In a cotton-press, the combination with a compression-cylinder comprising peripheral compression-rolls and pinions, compression-heads within the cage, a shaft extending from one of said heads and capable of moving in a direction to retract the compression-head, a master-gear carried by said shaft and meshing with the pinions, a spring carried by the shaft and urging the master-gear toward the pinions, a second spring carried by said shaft and bearing against a fixed part to urge the shaft in the direction to retract the compression-head and a plurality of cam-collars carried by said shaft, and designed to permit the successive actuation of the shaft under the impulse of the last-named spring to effect the successive retraction of the compression-head and the disengagement of the master-gear from its pinions, substantially as specified.

In testimony that I claim the foregoing as my own I have hereto affixed my signature in the presence of two witnesses.

HARTWELL M. PARKER.

Witnesses:
 JOHN N. KIKER,
 S. P. MARTIN.